United States Patent [19]
Sakka

[11] 3,808,512
[45] Apr. 30, 1974

[54] TRANSFORMERLESS POWER SUPPLY

[76] Inventor: Toshikatsu Sakka, 8-12, 4-chome, Higashi-Mukojima Sumida-ku Tokyo, Japan

[22] Filed: Apr. 5, 1973

[21] Appl. No.: 348,257

[30] Foreign Application Priority Data
Apr. 7, 1972 Japan.............................. 47-35461

[52] U.S. Cl. ............................................... 321/15
[51] Int. Cl. ............................................ H02m 7/00
[58] Field of Search ....................................... 321/15

[56] References Cited
UNITED STATES PATENTS
3,505,586  4/1970  Dulin ................................... 321/15
3,478,258  11/1969  Nagai................................... 321/15
3,602,795  8/1971  Gunn................................... 321/15

Primary Examiner—William M. Shoop, Jr.
Attorney, Agent, or Firm—Kenneth S. Goldfarb

[57] ABSTRACT

Two sets of identical capacitors with interposed rectifying diodes are connected in series between a pair of supply terminals connected to an AC source, so that the two sets of capacitors are charged alternately on the successive half cycles of the AC voltage delivered through the supply terminals. The potential difference thus stored in each capacitor corresponds substantially to the quotient of the peak value of the AC supply voltage by the number of the capacitors of each set. The two sets of capacitors are caused alternately to discharge in parallel through their respective diodes, switching elements such as thyristors and a common DC load.

6 Claims, 5 Drawing Figures

3,808,512

TRANSFORMERLESS POWER SUPPLY

BACKGROUND OF THE INVENTION

This invention relates generally to power supplies, and more specifically to an improved transformerless power supply driven from an AC source to supply a substantially constant DC voltage to a desired load.

Heretofore, for production of a DC voltage output from an AC supply voltage higher than the required DC voltage, step-down transformers have usually been required in addition to rectifying and smoothing circuits. However, the use of step-down transformers is undesirable in view of the weight, the bulkiness and the expenses involved, especially when a relatively high DC output is required. In order to avoid such disadvantages resulting from the use of step-down transformers, there have been recently developed power supplies in which a plurality of capacitors are connected in series across an AC source so as to be charged with equally divided fractions of the AC supply voltage and to be discharged in parallel through a DC load.

An example of such known transformerless power supplies is disclosed in U.S. Pat. No. 3,505,586, entitled "Transformerless High-Current Power Supply." The power supply according to this U.S. patent comprises two sets of series-connected identical capacitors, each set connected between a pair of AC input terminals in series with interposed charging diodes. The capacitors are further connected in closed series relation with respective controlled rectifiers, a DC load, and respective discharge diodes. When one of the AC input terminals becomes positive, one set of capacitors are charged in series through their respective charging diodes, and are then discharged in parallel through their respective controlled rectifiers and through the DC load. Likewise, when the other AC input terminal becomes positive, the other set of capacitors are charged in series, and are discharged in parallel through their own controlled rectifiers and through the same DC load.

However, according to this prior art power supply, there are required as many controlled rectifiers as the total number of the capacitors in use. Since controlled rectifiers are relatively costly, the advantage of inexpensiveness resulting from the disuse of a step-down transformer can be substantially offset, especially where a large number such controlled rectifiers are used.

SUMMARY OF THE INVENTION

In view of the noted disadvantages of the prior art, it is an object of this invention to provide a novel and improved power supply whereby a DC voltage substantially corresponding to the quotient of the peak value of an AC input voltage divided by practically any desired integer can be supplied to a load without need for the use of a step-down transformer or of controlled rectifiers proportional in number to capacitors in use.

Another object of the invention is to provide a power supply which is relatively small in size, light in weight and inexpensive to manufacture and which is easily adaptable to various output requirements.

With these objects in view and the other objects hereinafter pointed out, this invention provides a power supply driven from an AC source to supply a substantially constant DC voltage to a load, including a first set of capacitors connected in series between first and second AC supply terminals, each to be charged to a level substantially corresponding to the quotient of the peak value of the voltage from an AC source by the number of the capacitors of the first set. A first set of diodes are connected in the series-connected circuit of the first set of capacitors and the first and second AC supply terminals so as to permit the flow of charging current to the first set of capacitors only when the first AC supply terminal is positive. A second set of diodes are connected in a parallel-connected circuit of the first set of capacitors in order to prevent the flow of reverse current, and this parallel-connected circuit of the first set of capacitors and the second set of diodes is connected between first and second DC load terminals.

A second set of caacitors equal in number to the first set of capacitors are also connected in series between the first and second AC supply terminals, each to be charged to a level substantially corresponding to the quotient of the peak value of the voltage from the AC source by the number of capacitors of each set. A third set of diodes corresponding in function to the first set of diodes are connected in the series-connected circuit of the second set of capacitors and the first and second AC supply terminals so as to permit the flow of charging current to the second set of capacitors only when the second AC supply terminal is positive. A fourth set of diodes correspond to the second set of diodes, being connected in a parallel-connected circuit of the second set of capacitors in order to prevent the flow of reverse current, and this parallel-connected circuit of the second set of capacitors and the fourth set of diodes is also connected between the first and second DC load terminals.

A first switching element such as a thyristor is connected between the first DC load terminal and the parallel-connected circuit of the first set of capacitors and the second set of diodes, the first switching element being rendered conductive when the first set of capacitors are charged to the predetermined level so that these capacitors are caused to discharge in parallel through the DC load. A second switching element is connected between the first DC load terminal and the parallel-connected circuit of the second set of capacitors and the fourth set of diodes, and this second switching element is rendered conductive when the second set of capacitors are charged to the predetermined level so that the second set of capacitors are caused to discharge in parallel through the same DC load. By the repetition of this cycle of operation the DC load is impressed with the substantially constant DC voltage on each half cycle of the AC supply voltage.

The features which are believed to be novel and characteristic of this invention are set forth with particularity in the appended claims. The invention itself, however, both as to its organization and manner of operation, together with the further objects and advantages thereof, will be best understood from the following description taken in conjunction with the accompanying drawings which illustrate, by way of example only, some preferred embodiments of the invention and throughout which like reference characters denote like circuit elements.

DESCRIPTION OF THE PREFERRED EMBODIMENTS

Figure 1:
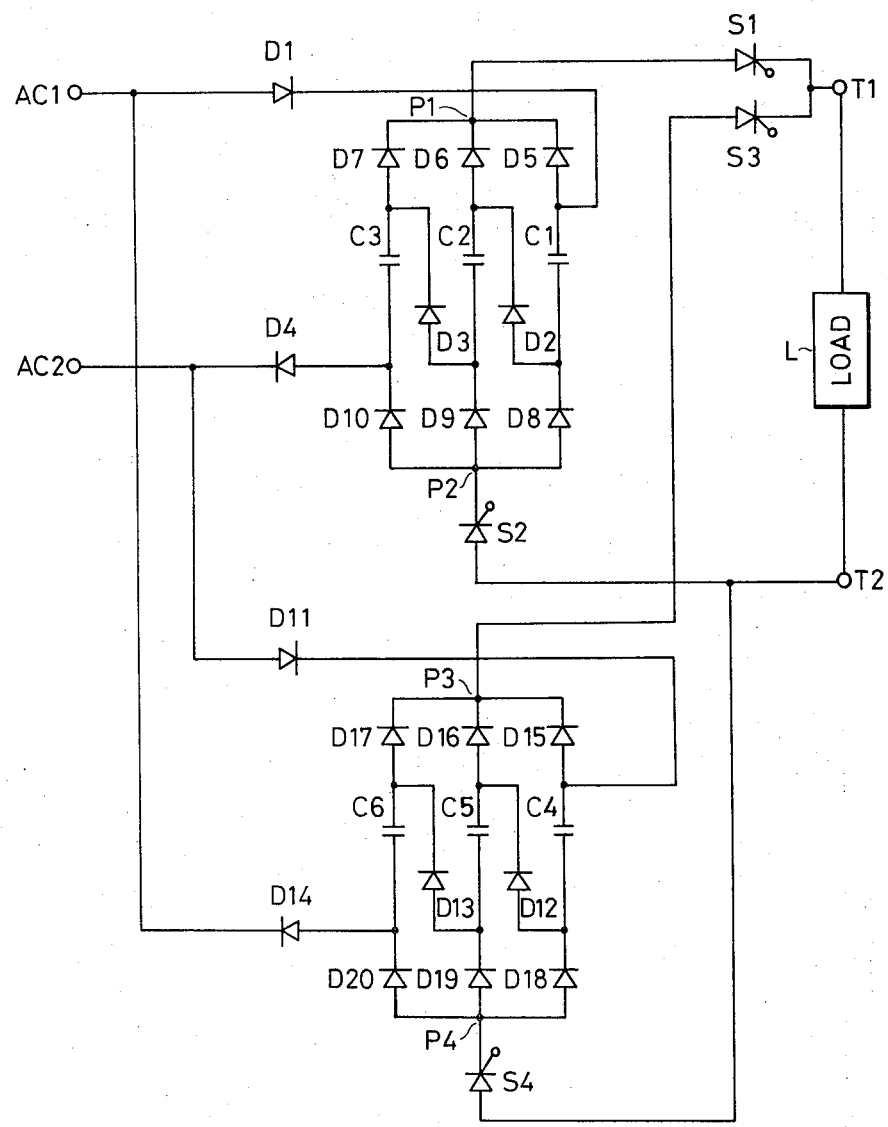
FIG. 1 is a schematic electrical diagram showing the circuit configuration of a transformerless power supply by way of a first preferred embodiment of this invention.

With reference to FIG. 1, the transformerless power supply illustrated therein by way of a first preferred embodiment of the invention is equipped with a pair of supply terminals AC1 and AC2 to be connected to an AC source not shown in the drawing. Connected in series between these supply terminals AC1 and AC2 are diode D1, capacitor C1, diode D2, capacitor C2, diode D3, capacitor C3, and diode D4. The capacitors C1 to C3 are of identical construction, and the positive electrodes of all these capacitors are connected to the anodes of diodes D5 to D7, respectively, which are adapted for prevention of the flow of reverse current, while the cathodes of these diodes D5 to D7 are connected commonly to a point P1.

This point P1 is connected to another point P2 via a series connection of a switching element S1 such as a thyristor, a load terminal T1, a load L, another load terminal T2, and another switching element S2. Connected commonly to this second point P2 are the anodes of diodes D8 to D10 adapted for prevention of the flow of reverse current, while the cathodes of these diodes D8 to D10 are connected to the negative electrodes of the aforesaid capacitors C1 to C3 respectively.

Also connected in series between the supply terminals AC1 and AC2 are diode D11, capacitor C4, diode D12, capacitor C5, diode D13, capacitor C6, and diode D14. The capacitors C4 to C6 are identical with the above described capacitors C1 to C3, and the positive electrodes of these capacitors C4 to C6 are connected to the anodes of diodes D15 to D17, while the cathodes of these diodes D15 to D17 are connected commonly to a point P3. This point P3 is connected to a further point P4 via a series connection of a switching element S3, the aforesaid load terminal T1, the load L, the other load terminal T2, and another switching element S4. COnnected commonly to the point P4 are the anodes of diodes D18 to D20 adapted for prevention of the flow of reverse current, while the cathodes of these diodes D18 to D20 are connected to the negative electrodes of the aforesaid capacitors C4 to C6 respectively.

In the first preferred embodiment of the invention, configured substantially as hereinbefore described, let it now be supposed that an AC voltage is impressed from the AC source with its positive half cycle to the supply terminal AC1. The capacitors C1 to C3 are charged as the current flows through the closed circuit formed by the supply terminal AC1, the diode D1, the capacitor C1, the diode D2, the capacitor C2, the diode D3, the capacitor C3, the diode D4, and the other supply terminal AC2.

Assuming that the AC voltage impressed as aforesaid across the supply terminals AC1 and AC2 has a peak value E in volts, and ignoring the forward voltage drops across the respective diodes D1 to D4, then the capacitors C1 to C3 are each charged with a voltage of E/3 volts. While these capacitors C1 to C3 are being charged, the other capacitors C4 to C6 are caused to discharge, and during the discharge of these latter capacitors C4 to C6 the switching elements S3 and S4 are held conductive and the switching elements S1 and S2 nonconductive. Conversely, during the discharge of the capacitors C1 to C3, the switching elements S1 and S2 are held conductive. The other capacitors C4 to C6 are then being charged, with the switching elements S3 and S4 held nonconductive.

If a gating pulse is caused to be impressed to the thyristors used as the switching elements S1 and S2 at the instant when the AC voltage being impressed to the supply terminal AC1 turns negative upon completion of the above described charging operation of the capacitors C1 to C3, then the switching elements S1 and S2 become conductive. Thereupon the capacitors C1 to C3 are caused to discharge in parallel through the closed circuit including the diode D5, D6 or D7, the switching element S1, the load terminal T1, the load L, the other load terminal T2, the switching element S2, and the diode D8, D9 or D10. In this manner the DC voltage of E/3 volts is impressed across the load L from the capacitors C1 to C3. The potential which has been released from the capacitors C1 to C3 is further utilized to reverse-bias the switching elements S3 and S4 to render the same nonconductive.

As the voltage being impressed through the supply terminal AC2 rises during the negative half cycle of the voltage being impressed through the other supply terminal AC1, the capacitors C4 to C6 are each charged to E/3 volts, as in the above described case of the capacitors C1 to C3, with the current flowing through the closed circuit including the supply terminal AC2, the diode D11, the capacitor C4, the diode D12, the capacitor C5, the diode D13, the capacitor C6, the diode D14, and the other supply terminal AC1.

If a gating pulse is caused to be impressed to the thyristors used as the switching elements S3 and S4 at the instant when the AC voltage being impressed through the supply terminal AC2 goes negative upon completion of the charging operation of the capacitors C4 to C6, then these switching elements S3 and S4 are rendered conductive. Thereupon the capacitors C4 to C6 are caused to discharge in parallel through the closed circuit including the diode D15, D16 or D17, the switching element S3, the load terminal T1, the load L, the other load terminal T2, the switching element S4, and the diode D18, D19 or D20. Hence the load L is supplied with the DC voltage of E/3 volts from the capacitors C4 to C6.

The potential which has been released from these capacitors C4 to C6 reverse-biases the switching elements S1 and S2 to render the same nonconductive. The capacitors C1 to C3 become again charged with the positive half cycle of the AC voltage now being impressed through the supply terminal AC1. By the repetition of the above described cycle of operation the load L is supplied with the DC voltage of approximately E/3 volts on each half cycle of the Ac voltage delivered through the supply terminals AC1 and AC2.

Figure 2:
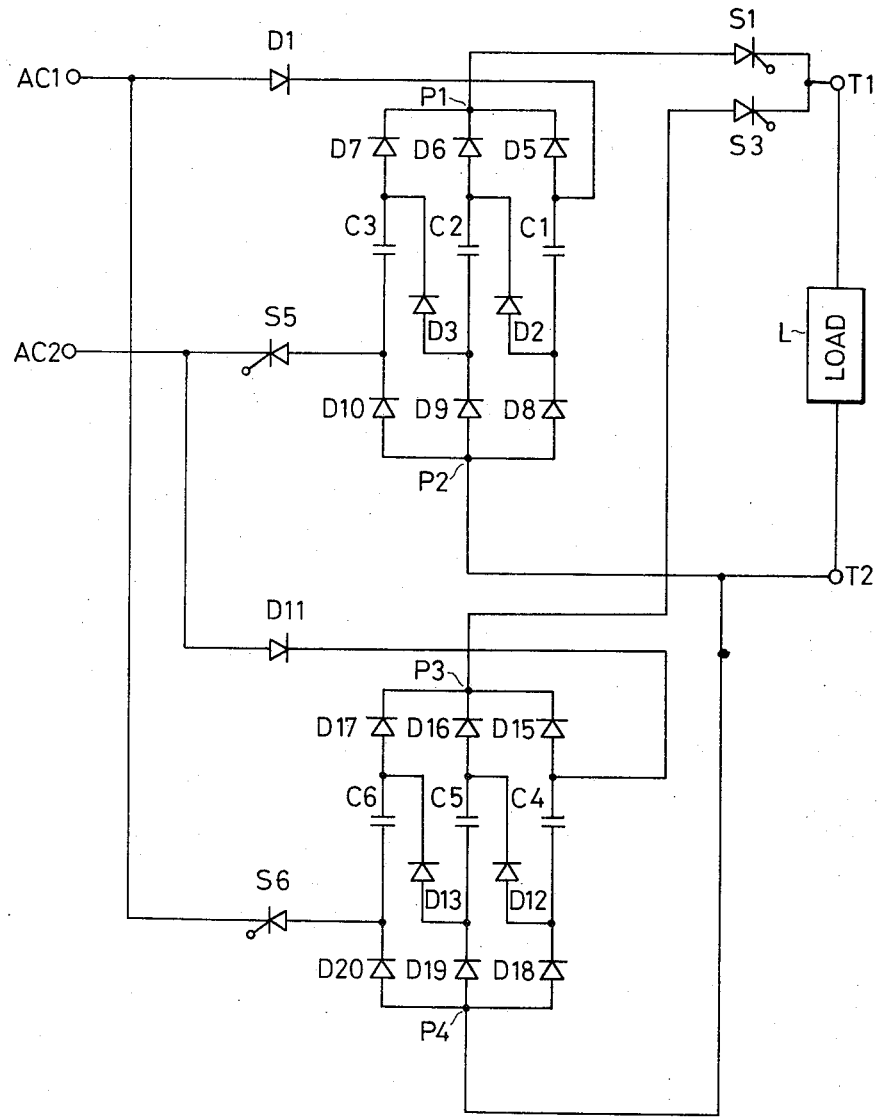
FIG. 2 is a similar diagram showing another preferred embodiment of the invention.

FIG. 2 illustrates another preferred embodiment of the invention, which dispenses with the switching elements S2 and S4 of the preceding embodiment to make do with a fewer number of thyristors used as the switching elements. However, additional thyristors can be used as switching elements S5 and S6 in place of the diodes D4 and D14, respectively, of the preceding embodiment to cause the switching elements S1 and S3 to become nonconductive precisely at desired instants.

In the circuit configuration of FIG. 2 the switching elements S1 and S6 are both caused to be conductive and the switching elements S3 and S5 to be nonconductive when the capacitors C1 to C3 discharge in parallel through the load. On the other hand, when these capacitors C1 to C3 are being charged, the switching elements S3 and S5 are both caused to be conductive and the switching elements S1 and S6 to be nonconductive. As previously mentioned, the switching elements S1 and S3 can be prevented from becoming nonconductive prematurely if the newly introduced switching element S5 or S6 is rendered conductive after the switching element S1 or S3 has become nonconductive.

If the AC and the DC sides of this second preferred embodiment of the invention are not commonly grounded, it will operate substantially as set forth in connection with the FIG. 1 embodiment, supplying to the load L a DC voltage being one-third the crest value of the AC supply voltage.

While in each of the above described two embodiments of the invention two sets of three series-connected capacitors are provided, to be charged alternately on each positive half cycle of the AC voltage supplied through the supply terminals AC1 and AC2, it will be apparent that the number of the capacitors is given purely by way of example. Another other appropriate number of capacitors and associated elements can be employed to provide a desired transformation ratio, without departing from the scope of the invention.

Figure 3:
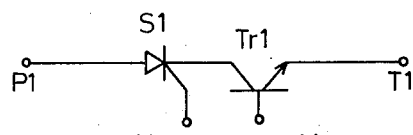
FIGS. 3 to 5 inclusive are partial schematic electrical diagrams showing modified examples of the embodiment of FIG. 1 or 2.
Figure 4:
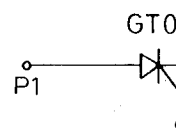
Figure 5:
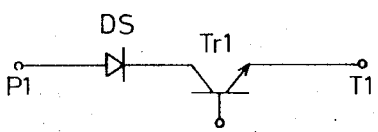

Illustrated in FIGS. 3 to 5 are modified examples of the preferred embodiment of either FIG. 1 or 2. In the example of FIG. 3, a transistor $Tr1$ to perform a switching function is connected between the switching element S1 and the load terminal T1. Although not shown in this drawing, it is assumed that another transistor is similarly connected between the switching element S3 and the load terminal T1 so as to perform a function identical with that of the exemplified transistor $Tr1$. (It is understood that in FIGS. 4 and 5, too, an element or elements connected between the point P1 and the load terminal T1 are also connected between the point P3 and the load terminal T1.) The transistor $Tr1$ of FIG. 3 has its collector connected to the cathode of the switching element S2 and its emitter to the load terminal T1. The base of this transistor $Tr1$ is to be connected to the output of a pulse generating circuit not shown in the drawing.

In operation, a gating pulse 10 is impressed to the switching element S1 simultaneously with the application of a pulse 11 having a prescribed pulse duration $t$ to the base of the transistor $Tr1$, the pulses 10 and 11 being back graphically represented in FIG. 3 by way of example, so that the switching element S1 and the transistor $Tr1$ are rendered conductive at the same time. Thereupon the capacitors C1 to C3 are caused to discharge in parallel through the switching element S1, the transistor $Tr1$ and the load L, thereby supplying to the load L the DC voltage of approximately E/3 volts as previously mentioned. Since the transistor $Tr1$ is held conductive for the prescribed duration $t$ of the pulse 11, the conduction period of the switching element S1 is regulated in accordance with the pulse duration $t$.

This arrangement of FIG. 3 has a distinct advantage over the embodiments of FIGS. 1 and 2 in which the switching elements S1 and S3 are rendered nonconductive only by being reverse biased. If, upon conduction of the switching element S3 in the embodiment of FIG. 1 or 2, the potential released from the capacitors C4 to C6 to be impressed to the load L via the switching element S3 happens to be lower than the potential of the capacitors C1 to C3, the other switching element S1 will not properly become nonconductive. The supply voltage is then allowed to be impressed directly to the load. This possibility is substantially eliminated by the scheme of FIG. 3, in which the conduction periods of the switching elements S1 and S3 are controlled by the pulse 11 having the predetermined duration $t$.

In the other modified example shown in FIG. 4, the switching elements S1 and S3 are replaced by what are known as gate turn-off thyristors GTO. Each of these gate turn-off thyristors GTO has its anode connected to the point P1 or P3 and its cathode to the load terminal T1. As is well known to those in the art, the gate turn-off thyristors perform a switching function by being impressed with gating pulses of positive or negative polarity. Other details of operation of this FIG. 4 embodiment will be apparent from the foregoing description of the FIG. 1 or 2 embodiment.

FIG. 5 illustrates a further modified example, in which the switching elements S1 and S3 of the FIG. 1 or 2 embodiment are each replaced by a diode DS and a transistor $Tr1$ (of exactly the same construction as the transistor $Tr1$ of FIG. 3). Each of the diodes DS has its anode connected to the point P1 or P3 and its cathode to the collector of each transistor $Tr1$. The emitter of the exemplified transistor $Tr1$ is connected to the load terminal T1, and its base to the output of a pulse generating circuit not shown in the drawing.

In the configuration of FIG. 5 the pulses 11 each having a predetermined pulse duration $t$ as shown in FIG. 3 are impressed to the base of the transistor $Tr1$ at prescribed time intervals. During introduction of each pulse 11 the transistor $Tr1$ is held conductive to permit the capacitors C1 to C3, or C4 to C6, to discharge in parallel via the diode DS, the transistor $Tr1$ and the load L. In this way the load is impressed with the DC voltage having one-third the peak value of the AC supply voltage, as will be apparent from FIG. 1 or 2.

Although the transformerless power supply according to this invention has been shown and described hereinbefore in terms of several preferred embodiments thereof, it is to be clearly understood that all matter described herein or shown in the accompanying drawings is by way of example only and is not restrictive of the invention in any way. It is therefore appropriate that the invention be construed broadly and in a manner consistent with the fair meaning or proper scope of the appended claims.

What is claimed is:

1. A power supply system driven from an AC source to supply a substantially constant DC voltage to a load, comprising: first and second supply terminals to be connected to the AC source; first and second load terminals to be connected to the load; a first set of capacitors connected in series between said first and second supply terminals each to be charged to a level substantially corresponding to the quotient of the peak value of the voltage from the AC source by the number of the capacitors of said first set; a first set of diodes connected in the series-connected circuit including said first set of capacitors and said first and second supply terminals, said first set of diodes being aeranged alternately with said first set of capacitors and being adapted to permit the flow of charging current to said first set of capacitors only when said first supply terminal is being impressed with each positive half cycle of the voltage from the AC source; a second set of diodes connected in a parallel-connected circuit of said first set of capacitors and adapted to prevent the flow of reverse current, said parallel-connected circuit of said first set of capacitors and said second set of diodes being connected between said first and second load terminals; a second set of capacitors connected in series between said first and second supply terminals each to be charged to a level substantially corresponding to the quotient of the peak value of the voltage from the AC source by the number of the capacitors of said second set, said second set of capacitors being equal in number to said first set of capacitors; a third set of diodes connected in the series-connected circuit including said second set of capacitors and said first and second supply terminals, said third set of diodes being arranged alternately with said second set of capacitors and being adapted to permit the flow of charging current to said second set of capacitors only when said second supply terminal is being impressed with each positive half cycle of the voltage from the AC source; a fourth set of diodes connected in a parallel-connected circuit of said second set of capacitors and adapted to prevent the flow of reverse current, said parallel-connected circuit of said second set of capacitors and said fourth set of diodes being connected between said first and second load terminals; a first series connection of a thyristor and a transistor connected between said first load terminal and said parallel-connected circuit of said first set of capacitors and said second set of diodes, said first series connection of a thyristor and a transistor being rendered conductive when said first set of capacitors are charged to the predetermined level whereby said first set of capacitors are caused to discharge in parallel through the load; and a second series connection of a thyristor and a transistor connected between said first load terminal and said parallel-connected circuit of said second set of capacitors and said fourth set of diodes, said second series connection of a thyristor and a transistor being rendered conductive when said second set of capacitors are charged to the predetermined level whereby said second set of capacitors are caused to discharge in parallel through the load.

2. A power supply system as defined in claim 1, further comprising a first switching element connected between said second load terminal and said parallel-connected circuit of said first set of capacitors and said second set of diodes, said first switching element being rendered conductive simultaneously with said first series connection of a thyristor and a transistor, and a second switching element connected between said second load terminal and said parallel-connected circuit of said second set of capacitors and said fourth set of diodes, said second switching element being rendered conductive simultaneously with said second series connection of a thyristor and a transistor.

3. A power supply system as defined in claim 2 wherein said first and said second switching elements are both thyristors.

4. A power supply system as defined in claim 1, including a switching element connected in place of that one of the diodes of said first set of diodes which is positioned closest to said second supply terminal, said switching element being rendered conductive simultaneously with said second series connection of a thyristor and a transistor, and an additional switching element connected in place of that one of the diodes of said third set of diodes which is positioned closest to said first supply terminal, said additional switching element being rendered conductive simultaneously with said first series connection of a thyristor and a transistor.

5. A power supply system as defined in claim 4, wherein said switching elements are both thyristors.

6. A power supply system as defined in claim 1, including a series connection of a diode and a transistor connected in place of each of said first and said second series connection of a thyristor and a transistor.

* * * * *